United States Patent
Sun et al.

(10) Patent No.: US 6,253,546 B1
(45) Date of Patent: Jul. 3, 2001

(54) TORQUE CONTROL SCHEME FOR LOW EMISSION LEAN BURN VEHICLE

(75) Inventors: Jing Sun, Bloomfield; Ilya Vladimir Kolmanovsky, Ypsilanti; Julia Helen Buckland, Dearborn; Mathew Alan Boesch, Plymouth, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/519,202

(22) Filed: Mar. 6, 2000

(51) Int. Cl.⁷ .............................. F01N 9/00; F02D 43/00
(52) U.S. Cl. .................... 60/285; 123/295; 123/681; 701/109
(58) Field of Search ........................ 123/295, 672, 123/681; 701/104, 109; 60/274, 275, 285

(56) References Cited

U.S. PATENT DOCUMENTS

| | | | |
|---|---|---|---|
| 5,727,385 | * 3/1998 | Hepburn | 60/274 |
| 5,778,666 | * 7/1998 | Cullen et al. | 60/285 |
| 6,079,204 | * 6/2000 | Sun et al. | 60/285 |
| 6,082,100 | * 7/2000 | Boegner et al. | 60/274 |
| 6,164,065 | * 12/2000 | Denari et al. | 60/284 |

* cited by examiner

Primary Examiner—Erick Solis
(74) Attorney, Agent, or Firm—Allan J. Lippa

(57) ABSTRACT

A method of minimizing torque disturbances in an internal combustion engine for a vehicle having a lean NOx trap that is periodically purged. The method includes the steps of generating feedforward values of first engine characteristics as a function of desired engine torque and generating feedback values of second engine characteristics as a function of intake manifold pressure. Target values are then calculated for predetermined engine variables based on the first and second engine characteristics. Engine variables are then set to the target values to compensate for torque disturbances resulting from the lean NOx trap purge cycle. According to the disclosed method, the feedforward path schedules the throttle, fuel rate and spark timing based on an engine model to produce a demanded engine torque. The feedback path then uses the values of fuel rate and spark timing to compensate for torque variations. This is accomplished by determining an error term as a function of a reference trajectory intake manifold pressure and measured intake manifold pressure.

18 Claims, 3 Drawing Sheets

TORQUE CONTROL SCHEME FOR LOW EMISSION LEAN BURN VEHICLE

FIELD OF THE INVENTION

The present invention relates generally to control systems for internal combustion engines and, more particularly, to a torque control strategy for gasoline direct injection stratified charge (DISC) and lean burn engines.

BACKGROUND OF THE INVENTION

Precious metal oxidation catalysts are generally used as a means for removing emissions from the exhaust gas of an internal combustion engine. These oxidation catalysts remove CO, HC, and NOx, simultaneously from engine exhaust gases when the air-fuel ratio of the exhaust gas is at a stoichiometric air-fuel ratio.

Exhaust after-treatment systems have included a second three-way catalyst downstream of the first three-way catalyst which is sometimes referred to as a lean NOx, trap (LNT) . Presently, however, the LNT is only a trapping device for NOx during the lean operation. The LNT must be periodically purged in order to maintain its level of efficiency. To meet the purge requirement, the DISC or lean burn engine must periodically operate at an air-fuel ratio rich of stoichiometry. In addition, the LNT has a very narrow operating temperature range beyond which the LNT trapping capacity and efficiency is greatly reduced.

For a DISC engine operating in a stratified mode, the LNT is typically purged by running the engine rich of stoichiometry for two-three seconds every 50 seconds. The engine control system must manage this purge cycle without causing noticeable torque disturbance to the vehicle. Prior art approaches to this problem involve the use of an electronic throttle, or other electrical supplemental torque devices, for example, a combined alternator-starter or continuously variable transmission (CVT). Such schemes, however, require actuators, in addition to the standard sensor set available on a DISC engine.

SUMMARY OF THE INVENTION

It is an object of the present invention to improve engine performance as well as fuel economy and emissions levels. It is another object of the present invention to provide a control strategy to optimize fuel consumption during the steady state operation of the engine and to minimize drivetrain disturbance during transient operation.

According to the present invention, the foregoing and other objects and advantages are attained by a method of minimizing torque disturbances in an internal combustion engine for a vehicle having a lean NOx trap that is periodically purged. The method includes the steps of generating feedforward values of first engine characteristics as a function of desired engine torque and generating feedback values of second engine characteristics as a function of intake manifold pressure. Target values are then calculated for predetermined engine variables based on the first and second engine characteristics. Engine variables are then set to the target values to compensate for torque disturbances resulting from the lean NOx trap purge cycle. According to the disclosed method, the feedforward path schedules the throttle, fuel rate and spark timing based on an engine model to produce a demanded engine torque. The feedback path then uses the values of fuel rate and spark timing to compensate for torque variations. This is accomplished by determining an error term as a function of a reference trajectory intake manifold pressure and measured intake manifold pressure.

One advantage of the present invention is that it reduces emissions and improves fuel economy. Another advantage is that it maintains constant, desired torque to the wheels for improved drivetrain performance during trap purge transient operation. Other features and advantages of the present invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention. In the drawings.

DETAILED DESCRIPTION OF THE PREFERRED EMBODIMENT(S)

Figure 1:
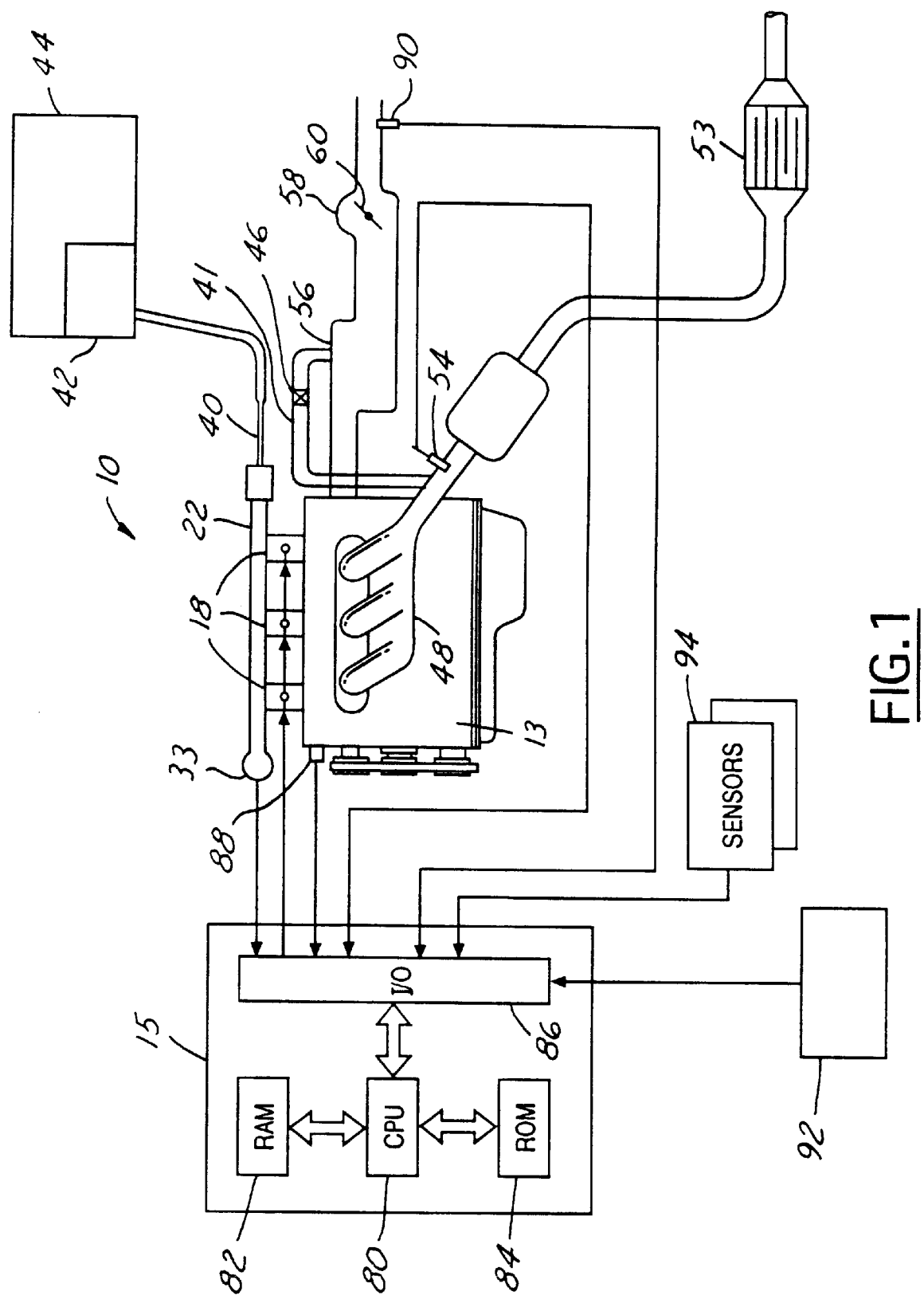
FIG. 1 is a schematic diagram of a DISC engine and control system according to one embodiment of the present invention.

An example of a DISC engine and associated control system in accordance with one embodiment of the present invention will now be discussed with reference to FIG. 1. The engine system 10 of an automotive internal combustion DISC engine 13 is controlled by an electronic engine controller (EEC) 15. The engine 13 comprises fuel injectors 18 which are in fluid communication with the fuel rail 22 and the cylinders (not shown) of the engine 13 for injecting fuel. The fuel delivery system includes the fuel rail 22, fuel rail pressure sensors 33, and fuel line 40 which couples the fuel rail 22 to the fuel delivery means which may include both a mechanical high pressure pump or a pump 42 housed within the fuel tank 44, to selectively deliver fuel to the fuel rail 22 and fuel injectors 18.

The engine 13 also comprises a plurality of spark plugs (not shown) wherein each of the spark plugs is associated with a cylinder of the engine 13. The spark plugs are activated by outputs from the engine controller 15.

The engine 13 also comprises exhaust manifold 48 coupled to exhaust ports of the engine (not shown). Exhaust manifold 48 includes a conduit 41 in fluid communication with the intake manifold 56. An exhaust gas recirculation (EGR) valve 46 controls the amount of exhaust gas recirculated from the exhaust manifold 48 to the intake manifold 56. Closely coupled to the exhaust manifold 48 is a three-way catalyst (TWC) 52, such as a conventional precious metal oxidation catalyst. The TWC 52 functions to oxidize the majority of the HC and CO as well as a portion of the NOx in the exhaust flow once the temperature of the TWC 52 reaches its operational range. The exhaust system further includes a lean NOx trap (LNT) 53 downstream from the TWC 52. A conventional universal wide range exhaust gas oxygen (EGO) sensor 54 is positioned upstream or downstream of the TWC 52 in the exhaust manifold 48.

Engine 13 further comprises intake manifold 56 coupled to intake ports of the engine (not shown). Intake manifold 56 includes a throttle body 58 having a throttle plate 60 therein. Throttle 60 controls the amount of air that enters the intake manifold 56 and is eventually mixed with the fuel in the engine cylinders.

The controller 15 includes a CPU 80 and associated memory such as random access memory (RAM) 82 and read-only memory (ROM) 84 having a computer readable code encoded therein. The CPU 80 communicates with an input/output (I/O) bus 86. The controller 15 controls the engine 13 by receiving various inputs through I/O bus 86 such as fuel pressure sensed by the pressure sensor 33; relative exhaust air/fuel ratio is sensed by EGO sensor 54; temperature of the engine 13 is sensed by temperature sensor 88; measurement of inducted mass air flow (MAF) from mass air flow sensor 90; engine speed (RPM) from engine speed sensor 92; and various other sensors 94.

Controller 15 also creates various outputs through I/O bus 86 to actuate various components of the engine control system. Such components include fuel injectors 18, EGR valve 46, spark plugs (not shown), and a swirl control valve (not shown) located within the intake manifold 56.

The NOx, purge is accomplished by controlling the engine air-fuel ratio to a value rich of stoichiometry. The mode transition between lean operation and rich operation is rapid, typically lasting one or two seconds. Unless the transition is carefully controlled, engine torque variations may result, which may affect the operation of the vehicle.

Figure 2:
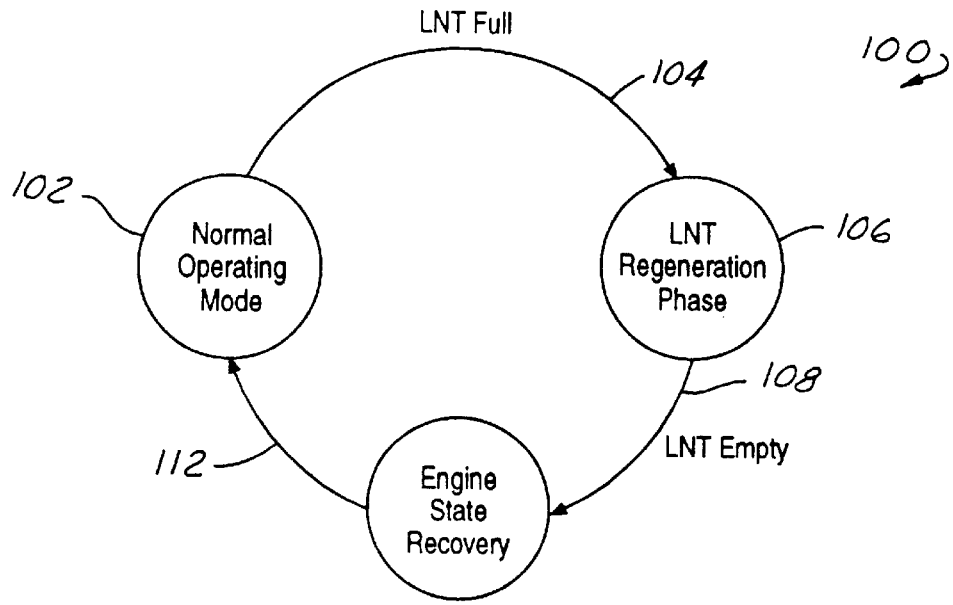
FIG. 2 is a flow diagram representing the modes of operation and transitions of the LNT purge cycle.

FIG. 2 is a flow diagram representing the modes of operation and the transitions of the LNT purge cycle 100. The engine operates in a normal operating mode 102 until the LNT becomes full 104. The LNT becomes full when the estimated mass of NOx, in the trap exceeds a predetermined threshold value. At this point, an LNT regeneration phase 106 also known as a purge mode is initiated. The LNT regeneration phase 106 occurs when the LNT is emptied of stored NOx, 108 by running the engine rich of stoichiometry for several seconds. The purge cycle then enters an engine state recovery phase 110 as the engine returns 112 to the lean, or stratified, normal operating mode 102.

During the LNT regeneration phase 106, the engine control variables are managed by the control strategy of the present invention so that the LNT purge is accomplished in the most efficient manner allowable without causing excessive engine speed or torque disturbances.

In the engine state recovery phase 110, the control strategy of the present invention brings the engine state to an optimal setting which corresponds to optimal fuel economy and emission operating points. The control strategy of the present invention is best described in conjunction with an engine/drivetrain dynamic model.

Figure 3:
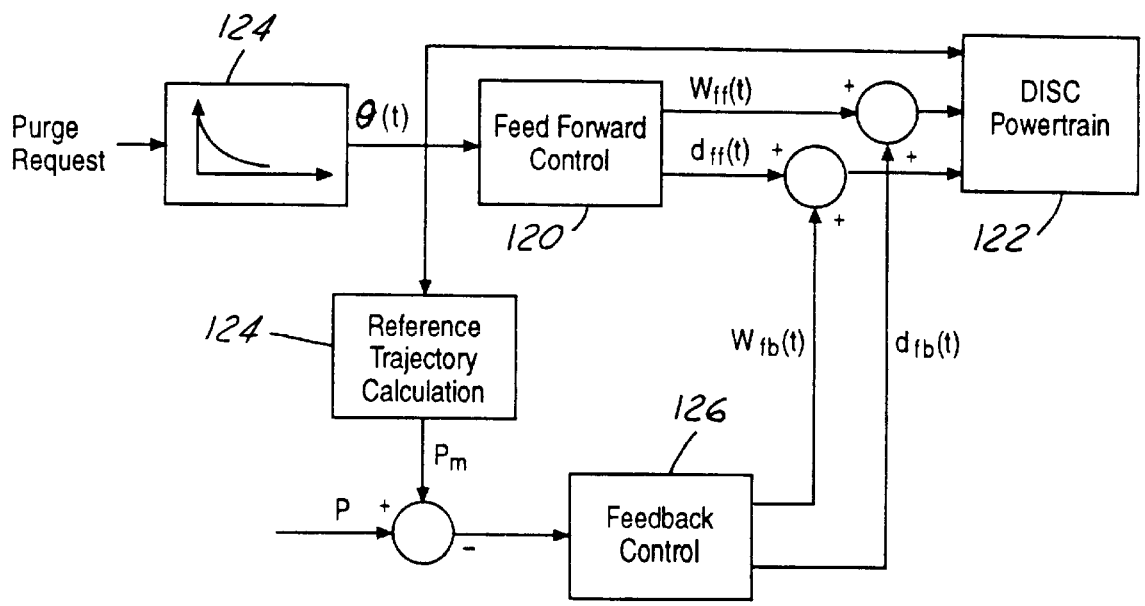
FIG. 3 is a block diagram of one embodiment of the control system for use in accordance with the engine system of FIG. 1.
Figure 4A:
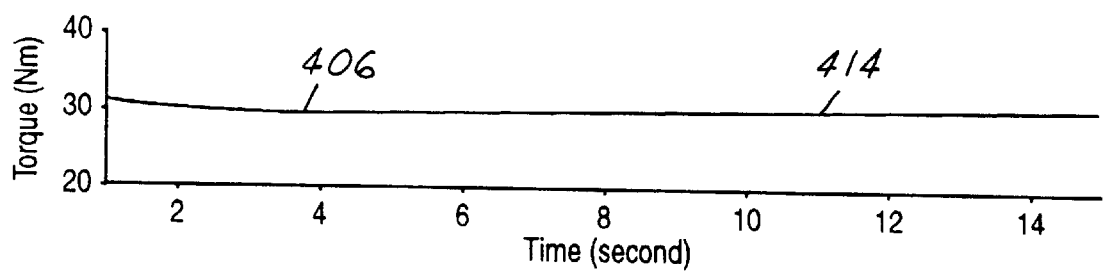
FIGS. 4A–4D are a series of graphs illustrating operation of the control system in a mode transient from homogeneous to stratified to homogeneous operations.
Figure 4B:
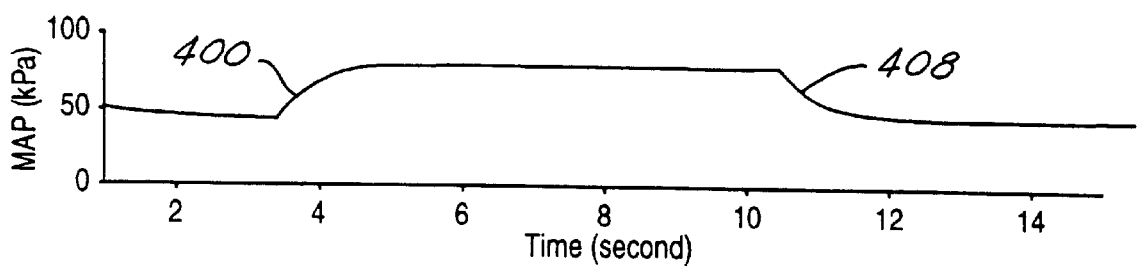
Figure 4C:
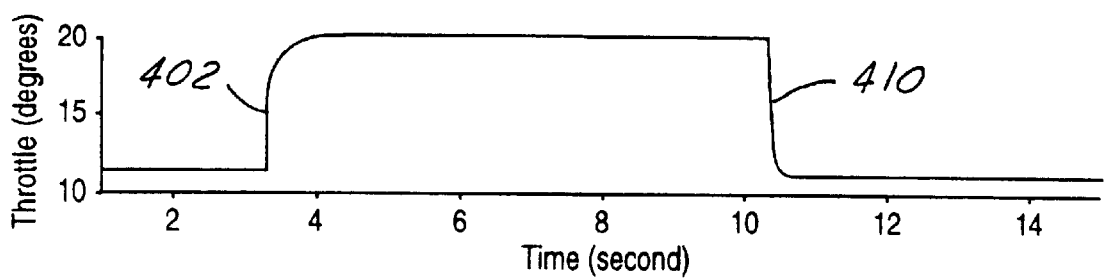
Figure 4D:
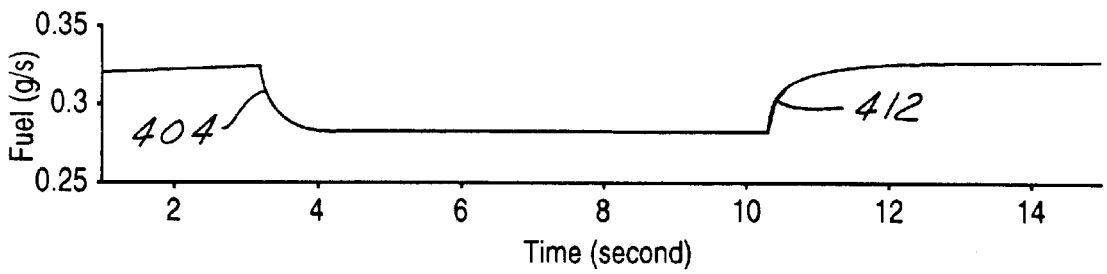

FIG. 3 is a block diagram of one embodiment of the control strategy for use with the engine system described in FIG. 1. The control strategy uses both feedforward and feedback to effect a smooth mode transition and manage the engine torque production.

The control scheme, as shown in FIG. 3, comprises two parts: a feedforward path and a feedback path. The feedforward control 120 communicates with the DISC powertrain 122 to schedule the electronic throttle, fueling rate, spark timing, EGR valve, and swirl control valve, based on an engine model 124, to produce a demanded torque. The feedback controller 126 uses fuel ($W_f$) and spark timing (d) to compensate the torque changes which may result from model discrepancy used in predicting the intake manifold pressure trajectory 128. More specifically, the feedback control 126 uses the desired manifold pressure (Pm) as the reference trajectory and compares it with the measured manifold pressure (P). The resulting error is used to calculate the required feedback quantity of fuel and spark to compensate for torque variations.

During normal operating mode, the engine is running in the stratified mode with an air-fuel ratio of, for example, 35:1. The brake torque produced by the engine depends on the engine speed, air-fuel ratio, fueling rate and manifold pressure among other things. This torque can be characterized by the following equation:

$$T=(a(N,r_{cyl})+b(N,r_{cyl},Fr)\,(d-d_{MBT})^2)W_f-f(N,P) \qquad (1)$$

wherein, $W_f$ is the fueling rate, N is the engine speed, P is the intake manifold pressure, d and $d_{MBT}$ are the spark timing and the spark timing corresponding to the maximum brake torque, $r_{cyl}$ and $F_r$ are the cylinder air-fuel ratio and burned gas fraction respectively. The terms a, b are simple polynomial functions which have different sets of coefficients in different operating modes. The term f is a polynomial function representing the pumping losses and mechanical rubbing friction. This term is proportional to the intake manifold pressure.

Once a request is made to purge the LNT, the throttle is moved in the closed direction following a pre-determined trajectory ($\theta_{th}=\theta(t)$) to reduce the manifold pressure and reduce the air-fuel ratio. Assuming a constant engine speed and zero EGR, the intake manifold pressure will change according to the dynamics equation:

$$dp/dt=K_i(f_{th}(\theta(t))\Phi(P/P_{amb})-g(N,P)) \qquad (2)$$

wherein the function $f_{th}(\theta(t))\Phi(P/P_{amb})$ is the mass air flow through the throttle body according to the standard orifice equation, g(N,P) is the pumping term reflecting volumetric efficiency. In the case of non-zero EGR, the EGR valve will also follow a predetermined trajectory and, thus, can be treated the same way as the throttle. All the functions in (2) are either known or can be determined from engine mapping. Accordingly, given θ(t), the trajectory for the intake manifold pressure as a function of time can be determined. This is referred to as the referenced trajectory of intake manifold pressure, $P_m(t)$. Given θ(t) and $P_m(t)$, the fueling rate and spark timing are scheduled according to equation (1) so that engine torque is kept constant.

The feedforward control schedules the throttle, fuel, and spark commands as follows:

$$u_{ff} = \begin{bmatrix} \theta(t) \\ W_{ff}(t) \\ d_{ff}(t) \end{bmatrix} \qquad (3)$$

If the models for equations (1) and (2) are perfect, equation (3) will keep the torque constant as the air-fuel ratio goes through transitions from, for example, 35:1 to 14:1, which represents the target purge air-fuel ratio. Due to the complexity of the combustion process, as well as other uncertainties, such as component variability, aging, and wearing, modeling errors occur which affect adversely the performance of the feedforward controller (3).

The present control scheme includes a feedback component to mitigate the effects of modeling errors and discrepancies between P and $P_m$, thereby enhancing performance robustness.

The feedback control interprets the deviation of the intake manifold pressure from the referenced trajectory (P−$P_m$) as modeling error. This error causes bias in the feedforward control leading to an over-estimated or under-estimated friction loss which in turn affects the engine torque production. The feedback controller then uses the fuel and spark to adjust the torque production as shown in the following equation:

$$u_{fb} = \begin{bmatrix} W_{fb}(P - P_m) \\ d_{fb}(P - P_m) \end{bmatrix} \quad (4)$$

Since the engine torque is proportional to fuel, while the pumping losses and other mechanical friction are proportional to intake manifold pressure, equation (4) can be simplified to use proportional feedback on the fuel term for torque compensation:

$$W_{fb} = K_{fb} \times (P - P_m), \, d_{fb} = 0 \quad (5)$$

wherein $K_{fb}$ represents the calibration controller gain.

FIG. 4A–4D shows a series of graphs illustrating the present control scheme in a DISC engine operating through the mode transition from homogeneous to stratified and back to homogeneous mode. As can be seen in FIGS. 4A–4D, while the manifold pressure 400, throttle angle 402, and fuel 404 transitioned from homogeneous state to stratified, the torque 406 remains relatively constant. Similarly, when the manifold pressure 408, throttle 410 and fuel 412 transitioned from stratified to homogeneous, the torque 414 remains constant.

From the foregoing, it will be seen that there has been brought to the art a new and improved engine control strategy which has the advantage of eliminating torque disturbance during the LNT purge mode.

While the invention has been described in connection with one or more embodiments, it will be understood that the invention is not limited to those embodiments. On the contrary, the invention covers all alternatives, modifications, and equivalents, as may be included within the spirit and scope of the appended claims.

What is claimed is:

1. A method of minimizing torque disturbances in an internal combustion engine for a vehicle having a lean NOx trap that is periodically purged, said method comprising the steps of:
    determining a first setpoint for predetermined engine characteristics based on a feedforward control scheme;
    determining a second setpoint for predetermined engine characteristics based on a feedback control scheme;
    generating target values for predetermined engine variables based on said first and second setpoints; and
    setting said engine variables to said target values to compensate for torque disturbances resulting from said lean NOx trap purge cycle.

2. The method of claim 1 wherein said step of calculating target values includes the calculating a target value for a fuel rate, a spark timing, and a throttle position.

3. The method of claim 1 wherein said step of determining a first setpoint for predetermined engine characteristics based on a feedforward control scheme includes calculating a desired fueling rate, a desired spark timing, and a desired throttle opening based on desired engine torque.

4. The method of claim 1 further comprising the step of calculating a reference trajectory of intake manifold pressure, and wherein said step of determining a second setpoint for predetermined engine characteristics based on a feedback control scheme includes calculating a desired fueling rate and calculating a desired spark timing based on said reference trajectory of intake manifold pressure.

5. The method of claim 1 wherein said step of determining a first setpoint for predetermined engine characteristics based on a feedforward control scheme includes calculating a desired fueling rate, a desired spark timing, and a desired throttle opening, a desired EGR valve position, and a desired swirl control valve position based on desired engine torque and engine speed.

6. The method of claim 1 further comprising the steps of calculating a reference trajectory of intake manifold pressure, and measuring intake manifold pressure, and wherein said step of determining a second setpoint for predetermined engine characteristics based on a feedback control scheme includes calculating a torque error as a function of said reference trajectory of intake manifold pressure and said measured intake manifold pressure.

7. A method of minimizing torque disturbances in an internal combustion engine for a vehicle having a lean NOx trap that is periodically purged, said method comprising the steps of:
    generating feedforward values of first engine characteristics as a function of desired engine torque;
    generating feedback values of second engine characteristics as a function of intake manifold pressure;
    calculating target values for predetermined engine variables based on said first and second engine characteristics; and
    setting said engine variables to said target values to compensate for torque disturbances resulting from said lean NOx trap purge cycle.

8. The method of claim 7 wherein said first engine characteristics include a fuel rate, a spark timing, and a throttle position.

9. The method of claim 8 wherein said first engine characteristics further include an EGR valve position.

10. The method of claim 8 wherein said first engine characteristics further include a swirl control valve position.

11. The method of claim 7 wherein said second engine characteristics include a fuel rate and spark timing.

12. The method of claim 7 wherein said predetermined engine variables include a fuel rate, a spark timing, and a throttle position.

13. The method of claim 7 wherein the step of generating feedback values of second engine characteristics as a function of intake manifold pressure includes calculating a reference trajectory of intake manifold pressure.

14. The method of claim 13 wherein the step of generating feedback values of second engine characteristics as a function of intake manifold pressure further includes generating an error value representing the difference between said reference trajectory of intake manifold pressure and said intake manifold pressure.

15. A torque control system for a vehicle having a direct injection stratified charge (DISC) engine coupled to a lean NOx trap that is periodically purged, the system comprising:
    a feedforward controller in operative communication with said DISC engine; and,
    a feedback controller in operative communication with said DISC engine, said feedforward controller adapted to receive as an input a desired engine torque value, and transmit as an output a first fueling rate, a first spark timing, and a throttle position, said feedback controller adapted to receive as an input an intake manifold pressure error value and transmit as an output a second fueling rate and second spark timing wherein said first and second fueling rate and said first and second spark timing represent target values to compensate for torque disturbances resulting from said lean NOx trap purge cycle.

16. The system of claim 15 further comprising an intake manifold pressure sensor providing a MAP value, and means for determining a reference trajectory intake manifold pressure, said intake manifold pressure error value being generated as a function of said MAP value and said reference trajectory intake manifold pressure.

17. The system of claim 15 wherein said feedforward controller is further adapted to transmit as an output an EGR valve position.

18. The system of claim 15 wherein said feedforward controller is further adapted to transmit as an output a swirl control valve position.

* * * * *